United States Patent [19]

Hirosawa et al.

[11] 4,031,049
[45] June 21, 1977

[54] POLYURETHANE CROSS-LINKING AGENTS

[75] Inventors: Frank N. Hirosawa, Monterey Park; Ming H. Lee, Glendale, both of Calif.

[73] Assignee: Furane Plastics, Inc., Los Angeles, Calif.

[22] Filed: Apr. 22, 1974

[21] Appl. No.: 462,811

Related U.S. Application Data

[63] Continuation-in-part of Ser. No. 60,742, Aug. 3, 1970, abandoned.

[52] U.S. Cl. .................... 260/2.5 AM; 252/426; 252/431 C; 260/2.5 AC; 260/77.5 AC; 260/77.5 AM
[51] Int. Cl.² .................................. C08G 18/32
[58] Field of Search .......... 260/2.5 AM, 2.5 AC, 260/77.5 AM, 77.5 AC, 75 NH, 75 NC; 252/426, 431 N

[56] References Cited

UNITED STATES PATENTS

| | | | |
|---|---|---|---|
| 2,765,341 | 10/1956 | Wirth | 260/77.5 AM |
| 3,036,996 | 5/1962 | Kogon | 260/77.5 AM |
| 3,188,302 | 6/1965 | Lorenz | 260/2.5 AM |
| 3,425,999 | 2/1969 | Axelrood | 260/77.5 AM |
| 3,583,926 | 6/1971 | Zwolinski | 260/77.5 AM |
| 3,586,649 | 6/1971 | Cobbledick | 260/2.5 BB |
| 3,670,010 | 6/1972 | Appleton | 260/2.5 AC |
| 3,691,265 | 9/1972 | Cobbledick | 260/2.5 AM |
| 3,714,127 | 1/1973 | Fabris | 260/77.5 AM |
| 3,718,619 | 2/1973 | Rustad | 260/77.5 AM |
| 3,718,624 | 2/1973 | Rustad | 260/77.5 AM |
| 3,729,370 | 4/1973 | Cobbledick | 260/2.5 AM |
| 3,736,295 | 5/1973 | Meckel | 260/77.5 AM |
| 3,740,377 | 6/1973 | Huffman | 260/77.5 AM |
| 3,752,790 | 8/1973 | McShane | 260/77.5 AM |
| 3,766,148 | 10/1973 | Taub | 260/77.5 AM |
| 3,775,350 | 11/1973 | Junas | 260/2.5 AM |
| 3,816,360 | 6/1974 | Taub | 260/77.5 AM |

OTHER PUBLICATIONS

Dwyer, "Journal American Chemical Society," vol. 17, pp. 3863–3864 (1923).
Brooks, "Chemical Abstracts," vol. 51, pp. 9628–9629 (1957).
Nromatka, "Chemical Abstracts," vol. 52, p. 9138 (1958).

*Primary Examiner*—C. Warren Ivy
*Attorney, Agent, or Firm*—Kenneth G. Wheeless; Robert P. Auber; Robert Spector

[57] ABSTRACT

Polyurethane elastomers, low density high resiliency polyurethane foams and compositions and processes for preparing urethane foams and elastomers comprising reacting a mixture of a polyalkylene polyol having reactive hydrogen atoms as determined by the Zerewitinoff method exhibiting a molecular weight of at least 500, at least one organic polyisocyanate, and as a crosslinking agent at least one sulfur-containing polyamine compound exhibiting the formula:

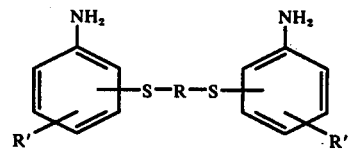

wherein R is a hydrocarbon, and R' is selected from the group consisting of hydrogen, halogens, and hydrocarbons.

28 Claims, No Drawings

POLYURETHANE CROSS-LINKING AGENTS

This application is a continuation-in-part of Ser. No. 60,742 filed Aug. 3, 1970 and now abandoned.

This invention relates to novel polyurethane elastomers and foams and to novel compositions and methods for producing such elastomers and foams.

It is well known that a polyurethane can be prepared by reacting organic poly-functional isocyanates with organic compounds having two or more reactive hydrogen atoms as determined by the Zerewitinoff reaction. When this reaction is conducted under anhydrous conditions, the resulting polyurethane may be elastomeric. If a cellular or foamed product is desired, water and an excess of isocyanate must be added to the mixture. When water reacts with the excess isocyanate groups not previously reacted, carbon dioxide is formed and entrapped in the reaction mixture. Various materials have been employed as catalysts or activators in the formation of polyurethanes.

The preparation of foam from polyurethanes requires a predetermined control of the blowing or gas forming reaction which liberates the carbon dioxide. Although many systems have been tried, there is no simple commercial system which will permit the production of polyurethane elastomers and foams.

It is an object of this invention to provide a novel foam product based on polyurethane. It is a further object of this invention to provide a novel foaming agent for polyurethane prepolymers for applications where elimination of safety hazards is necessary. Other objects will be apparent to those skilled in the art on inspection of the following description.

This invention is a process for making elastomeric or cellular polyurethane comprising reacting an organic polyisocyanate with a polyalkylene polyol having reactive hydrogen atoms as determined by the Zerewitinoff method, in the presence of a cross-linking agent comprising at least one compound selected from those of the formula:

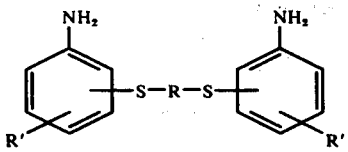

wherein R is a hydrocarbon, and R' is selected from the group consisting of hydrogen, halogens, and hydrocarbons.

DETAILED DESCRIPTION

This invention relates to polyurethane elastomers, low density high resiliency polyurethane foams and to compositions and processes for prepared urethane foams and elastomers comprising reacting a mixture of a polyalkylene polyol having reactive hydrogen atoms as determined by the Zerewitinoff method exhibiting a molecular weight of at least 500, at least one organic polyisocyanate, and as a cross-linking agent at least one sulfur-containing polyamine compound exhibiting the formula:

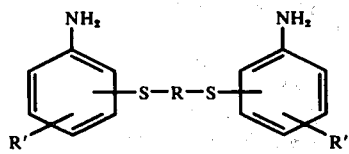

wherein R is a hydrocarbon, and R' is selected from the group consisting of hydrogen, halogens, and hydrocarbons.

In this compound, R may be a hydrocarbon radical preferably selected from the group consisting of alkyl, alkenyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e. having less than about 8 carbon atoms i.e. octyls and lower. When R is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted e.g. may bear a non-reactive substituent such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, γ-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

The radical R' may be selected from the group consisting of hydrogen, halogen and hydrocarbon. Preferably, R' is hydrogen. R may be halogen having an atomic weight greater than 19, e.g., chlorine, bromine, and iodine.

When R' is hydrocarbon, it may typically be selected from the same group as R, i.e. it may be selected from the group consisting of alkyl, aryl and alkenyl, including inertly substituted alkyl, aryl and alkenyl. R' may typically be methyl, ethyl, n-propyl, isopropyl, n-butyl, isobutyl, sec-butyl, tert-butyl, amyl, hexyl, octyl, decyl, dodecyl, octadecyl, cyclohexyl, cycloheptyl, vinyl, allyl, 1-propenyl, 1-butenyl, 2-butenyl, 3-butenyl, phenyl, naphthyl, phenanthryl, chlorophenyl, nitrophenyl, benzyl, tolyl, ethylphenyl, phenylethyl, chlorobutyl, 2-ethylhexyl, ethoxyethyl, methylcyclohexyl, 3-chloro-2-butenyl, etc. R and R' may be the same or different and the two R' radicals may be the same or different. R' may also include divalent hydrocarbons, preferably divalent alkyl (alkandiyl), which may be joined to form a cyclic structure including the nitrogen atom of the dithiocarbamate radical or which may form a bridged structure connecting two dithiocarbamate moieties. For example, R' may be methylene, ethylene, 1,2-propylene, trimethylene, 1,2-butylene, tetramethylene, pentamethylene, hexamethylene, octamethylene, decamethylene, 0phenylene, m-phenylene, p-phenylene, 4,4'-biphenylene, α-tolylene, xylylene, etc.

Preferred cross-linking agents of this invention are Bis(o-aminophenylthio) methane, Bis(o-aminophenylthio) ethane, Bis(o-aminophenylthio)-1,2 propane and Bis(o-aminophenylthio)-1,4 benzene.

Polyols used in making the polyurethanes of the present invention are primary and secondary hydroxy-terminated polyoxyalkylene ethers have from 2 to 4 hydroxyl groups and a molecular weight of from about 1,000 to 10,000. They are liquids or are capable of being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl. Among the polyoxyalkylene polyols which are useful in the practice of this invention are the polyethylene glycols, the polypropylene glycols, and polybutylene ether glycols. Polymers and copolymers of polyoxyalkylene polyols are also adaptable in the process of this invention as well as the block copolymers of ethylene oxide and propylene oxide. Among the copolymers of polyoxyalkylene polyols that deserve some special mention are the ethylene oxide, propylene oxide and butylene oxide adducts of ethylene glycol, propylene glycol, diethylene glycol, dipropylene glycol, triethylene glycol, 2-ethylhexande-diol-1,3,glycerol 1,2,6-hexanetriol, trimethylolpropane, trimethyolethane, tris(hydroxyphenyl) propane, thiethanolamine, triisopropanolamine, ethylenediamine, and ethanolamine. Linear and branched copolyethers of ethylene oxide and propylene oxide are also useful in making the foamed products of this invention with the preferred ones being those end-blocked with ethylene oxide to provide primary hydroxyl groups in the polymer and having molecular weights of from about 2000 to 5000.

Further useful types of polyetherpolyols are block copolymers prepared from propylene oxide and ethylene oxide. These polyethers can be characterized by the general formulae:

This has the advantage of making a larger proportion of the isocyanate used available for the evolution of carbon dioxide and the reducing of the overall amount of isocyanate that is required in the preparation of the foamed polymer. Mixtures of polyether polyols can be used.

Examples of these polyoxyalkylene polyols include polypropylene glycols having average molecular weights of 500 to 5,000 and reaction products of propylene oxide with linear diols and higher polyols, said higher polyols when employed as reactants giving rise to branched polyoxyalkylene polyols; and ethylene oxide, propylene oxide copolymers having average molecular weights of 500 to 5,000 in which the weight ratio of ethylene oxide to propylene oxide ranges between 10:90 and 90:10, including reaction product mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols include glycerol, trimethylol propane, 1,2,6-hexane triol, pentaerythritol and sorbitol.

Another class of polymers having terminal groups that contain reactive hydrogen atoms suitable for reaction with polyisocyanates are lactone polymers, preferably those exhibiting molecular weights within the range of 500 to 10,000.

In the preparation of a cellular polyurethane, water is mixed with the condensation product of an alkylene oxide and an organic polyisocyanate to produce carbon dioxide which acts as a blowing agent. Many foaming or blowing catalysts may be used to accelerate the formation of cellular polyurethane.

It is a feature of this invention that the synergistic blowing catalyst combination herein noted may be used in connection with a wide variety of gel catalysts including for example dibutyltin dilaurate and stannous 2-ethylhexoate, etc. In practice of the preferred embodiment of this invention, the preferred gelation catalyst which may be employed may be selected from the group consisting of $Sn(OCOR)_2$ and $R'_aSnX_b$. Other equivalent gelation catalysts may be employed. In the

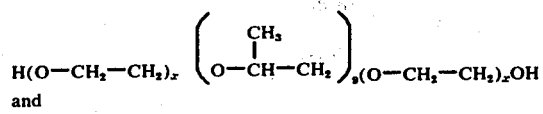
(A)

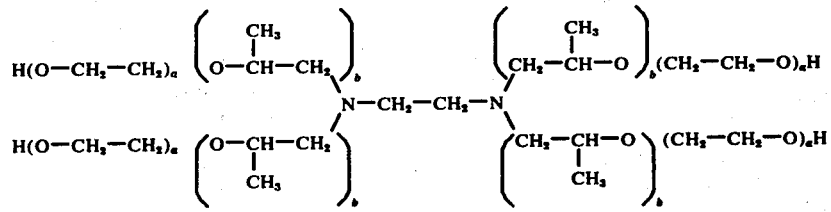
(B)

wherein Formula A the total of subscripts, $x$, $y$, and $z$ represent positive integers in the range of from 20 to 70 and the total of subscripts $a$ and $b$ of Formula B represent positive integers in the range of from 20 to 100.

Polyethers having a branched chan network are also useful. Such branched chain polyethers are readily prepared from alkylene oxides of the type above described and initiators having a functionality greater than two. Branched polyethers have the advantage of making possible cross linking without the interaction of urea or urethane groups with the isocyanate groups.

stannous compounds, $Sn(OCOR)_2$, R may be a hydrocarbon residue typically alkyl, alkenyl, aryl, aralkyl, alkaryl, cycloalkyl, etc. R may, for example, be methyl, ethyl, propyl, isopropyl, n-butyl, isobutyl, t-butyl, amyl, hexyl, heptyl, octyl, nonyl, decyl, undecyl, oleyl i.e. 7-heptadecenyl, etc., phenyl, o-, m-, or p-tolyl, naphthyl, cyclohexyl, benzyl, etc. The nature of R will, of course, define the group —OCOR, when R is methyl, for example, this group may be the acetate group. Preferably, however, the R group will contain at least about 7 carbon atoms and less than about 17 carbon atoms. When R is heptyl, the group —OCOR may be the 2-ethylhexoate group; when R is 7-heptadecenyl, the group —OCOR is the oleate group, etc. The preferred compounds which may be employed is stannous 2-ethylhexoate and stannous oleate.

In the organotin compounds $R'_a SnX_b$, $R'$ may be the same as R. Preferably $R'$ will be a hydrocarbon residue, typically alkyl, alkenyl, aryl, alkaryl, aralkyl, cycloalkyl, etc. $R'$ may be, for example, methyl, ethyl, propyl, isopropyl, n-butyl, isobutyl, t-butyl, amyl, hexyl, heptyl, octyl, nonyl, decyl, undecyl, oleyl, i.e. 7-heptadecenyl, etc., phenyl o-, m-, or p-tolyl, naphthyl, cyclohexyl, benzyl, etc. The sum of $a$ and $b$ will be 4, and either of $a$ and $b$ may be 1, 2, and 3. The preferred $R'$ group is the n-butyl group $C_4H_9$—.

In the organotin compounds $R'_a SnX_b$, X may be selected from the group consisting of chlorides and the negative residual portions of organic carboxylic acids RCOO—, mercaptides RS—, alcohols RO—, esters of mercaptoacids $ROOC(CH_2)_n S$ wherein R may be hydrogen or the other residues hereinbefore noted; etc. Typical specific residual portions may include the 2-ethylhexoate, the lauryl mercaptide, the methoxide, and the isooctyl thioglycolate.

The preferred organotin compounds $R'_a SnX_b$ may be those wherein $a$ and $b$ are 2; e.g. dibutyltin dilaurate and dibutyltin di-2-ethylhexoate.

In the practice of this invention, the gel catalyst and the blowing catalyst may be present in ratio of 0.01 to 5 parts, say 1 part of the former per part of the latter. In one preferred embodiment, when the catalyst combination of this invention includes stannous 2-ethylhexoate as the gel catalyst, the ratio will be approximately 1.

Preferably the catalyst mixture will be present in catalytic amount corresponding to 0.01 to 5, say 0.6 parts by weight per 100 parts of polyol. Preferably, the cross-linking agent will be present in an amount corresponding to 0.005 to 10.0, say 5.0 parts by weight per 100 parts of polyol, and the gel catalyst will be present in catalytic amount corresponding to 0.005 to 10.0 parts, say 0.3 parts by weight per 100 parts of polyol.

It is also a feature of this invention that the combination herein noted may be used in connection with a wide variety of blowing or foaming catalysts. These may include tertiary amines, metal soaps wherein the metal may be antimony, bismuth, arsenic, manganese, iron, cobalt, nickel, alkali metal (including ammonium), alkaline earth metal, silver, zinc, cadmium, aluminum, or lead, or organotin compounds having the formula $R'_3SnX'$ wherein $R'$ is hydrocarbon and $X'$ is selected from the group consisting of the negative residual portion of an organic carboxylic acid, a mercaptan, an alcohol, a phenol, and a halogen acid.

Typical tertiary amines which may be employed include N-alkyl morpholines, e.g. N-methyl morpholine, N-ethyl morpholine (NEM) and cyclic triethylene diamine including, e.g. that which is sold under the trademark DABCO. Particularly preferred tertiary amine blowing catalysts may contain N-ethyl morpholine or cyclic triethylene diamine or mixtures thereof, the mixtures containing say about 1–2 parts by weight of cyclic triethylene diamine per 3 parts of N-ethyl morpholine. Tertiary amine blowing catalysts may be particularly desirable when fast rise times are desired.

Typical metal soaps which may be employed as blowing catalysts include compounds having the formula $N(OOCR'')_n$ wherein M is selected from the group consisting of antimony, bismuth, arsenic, manganese, iron, cobalt, nickel, silver, zinc, cadmium, aluminum, and lead, $R''$ is a hydrocarbon group and $n$ is a small whole integer corresponding to the valence of M, typically 1, 2, 3, etc. Preferably $n$ is 1 and the acid from which the soap is derived is monobasic. Among the hydrocarbon groups which may be represented by $R''$, the following may be particularly noted: aliphatic or cycloaliphatic groups such as alkyl, alkenyl, etc. and corresponding cyclic groups such as cycloalkyl, etc.; an aryl group such as phenyl, substituted phenyls, naphthyl, etc.; an aralkyl group such as benzyl, styryl, cinnamyl, etc.; an alkaryl group such as tolyl, xylyl, etc.; a cycloaliphatic group such as a naphthenic group; etc. Other equivalent groups may be employed. In a preferred embodiment, $R''$ may be an alkyl group having less than about 21 carbon atoms. Typical of the acids from which the soaps may be prepared may be acetic acid, propionic acid, butyric acid, caproic acid, caprylic acid, capric acid, stearic acid, oleic acid, etc. Naphthenic acid may be employed. The commercially-occurring mixture of acids known as "tall oil fatty acids" may be employed. When the metal M is antimony, bismuth or arsenic, the preferred $R''$ group may be an aliphatic group having 6–21 carbon atoms. Typical preferred acids from which these particular soaps may be prepared include 2-ethyl hexoic acid, pelargonic acid, oleic acid, tetrachlorobenzoic acid, cyclohexyl carboxylic acid, and commercially-occurring mixture of tall oil fatty acids.

Specific metal soaps include: antimony tri-2-ethyl hexoate; antimony tripelargonate; arsenic trioleate; antimony tritallate; bismuth tri-2-ethylhexoate; arsenic tripelargonate; antimony tri(tetrachlorobenzoate); antimony tri(cyclohexylcarboxylate); bismuth trioleate; ferric stearate; manganous stearate; cobaltous stearate; cobaltous naphthenate; ferric linoleate; manganous linoleate; ferrous stearate; nickel stearate; calcium naphthenate; ammonium stearate; dimethylammonium stearate; trimethylammonium stearate; calcium stearate; magnesium stearate; barium stearate; lithium stearate; sodium stearate; strontium stearate; potassium oleate; ammonium tallate; strontium 2-ethylhexoate; lead naphthenate; zinc naphthenate; aluminum monostearate; aluminum distearate; aluminum tristearate; plumbous stearate; plumbous stearate (basic); zinc stearate; cadmium stearate; silver stearate; silver acetate; lead pelargonate. Preferred metal soaps include: antimony tritallate; manganese linoleate; ferrous stearate; nickel stearate; calcium naphthenate; barium stearate; sodium stearate; calcium stearate; zinc naphthenate; plumbous stearate; and aluminum distearate. Most highly preferred metal soaps include: manganese linoleate; calcium naphthenate; cadmium stearate; and particularly antimony tritallate.

In the practice of this invention, according to certain of its aspects, when a blowing catalyst is employed, the curing catalysts may be present in a ratio of 0.1–5 parts by weight to 1 part by weight of blowing catalyst, preferably 0.5–2.5 to 1.

Preferably the catalyst mixture will be present in catalytic amount corresponding to 0.01 to 5, say 0.6 parts by weight per 100 parts of polyol. Preferably, the blowing catalyst will be present in a catalytic amount corresponding to 0.005 to 4.95, say 0.3 parts by weight per 100 parts of polyol, and the gel catalyst will be present in a catalytic amount corresponding to 0.005 to 4.2 parts, say 0.3 parts by weight per 100 parts of polyol.

The process of this invention is particularly adapted for making both cellular polyurethanes and non-porous polyurethane plastics. The cross-linking compositions provided by this invention are efficacious in preparing elastomeric or highly resilient urethane products by casting processes or by processes in which a millable gum is formed. In processes of this type, the condensation product of an alkylene oxide is reacted with an organic polyisocyanate and at least one compound exhibiting the formula:

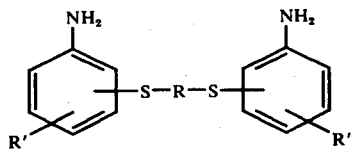

wherein R is a hydrocarbon, and R' is selected from the group consisting of hydrogen, halogens, and hydrocarbons.

A variety of organic polyisocyanates may be used in the practice of this invention although diisocyanates are preferred in many formulations. Suitable polyfunctional isocyanates include alkylene diisocyanates such as hexamethylene diisocyanates, and decamethylene diisocyanates, tolylene diisocyanates, napththalene diisocyanates, 4,4'-diphenylmethane diisocyanates, isomers or mixtures of any of these. Triisocyanates typically obtained by reaction with 3 moles of an arylene diisocyanate with 1 mole of a triol, e.g. the reaction products formed from 3 moles of tolylene diisocyanate and 1 mole of hexane triol may be employed. A preferred polyisocyanate is the mixture of 80% 2,4-tolylene diisocyanate and 20% 2,6-tolylene diisocyanate.

The term "isocyanates" is used herein to refer to polyisocyanates and to polyisothiocyanates, respectively, including particularly diisocyanates and diisothiocyanates. While the invention has been described specifically with reference to the reaction of certain diisocyanates, it is generically applicable to the reaction of any compound containing two or more —N=C=G groups in which G is oxygen or sulfur. Compounds within this generic definition include polyisocyanates and polyisothiocyanates of the general formula R(NCG)$_x$ in which $x$ is two or more and R can be alkylene, substituted alkylene, arylene, substituted arylene, a hydrocarbon or substituted hydrocarbon containing one or more aryl —NCG bonds and one or more alkyl —NCG bonds, a hydrocarbon or substituted hydrocarbon containing a plurality of either aryl —NCG or alkyl —NCG bonds. R can also include radicals such as —R—X—R where Z may be any divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanate-p-methane, xylylene diisocyanates, (OCNCH$_2$CH$_2$OCH$_2$)$_2$, 1-methyl-2,4-diisocyanate-cyclohexane, phenylene diisocyanates, tolylene diisocyanates, chlorophenylene diisocyanates, diphenylmethane-4,4'-diisocyanate, naphthalene-1,5-diisocyanate, triphenylmethane-4, 4',4''-triisocyanate, xylene-α,α'-diisothiocyanate, and isopropylbenzene-α,4-diisocyanate.

Further included are dimers and trimers of isocyanates and diisocyanates and polymeric diisocyanates of the general formulae (RNCG)$_x$ and [R(NCG)$_x$]$_y$ in which $x$ and $y$ are two or more, as well as compounds of the general formula M(NCG)$_x$ in which $x$ is two or more and M is a difunctional or polyfunctional atom or group. Examples of this type include ethylphosphonic diisocyanate, C$_2$H$_5$P(O)(NCO)$_2$; phenylphosphonic diisocyanate, C$_6$H$_5$P(NCO)$_2$; compounds containing a ≡Si—NCG group, isocyanates derived from sulfonamides (RSO$_2$NCO), cyanic acid, and thiocyanic acid.

Substances having two or more active hydrogen atoms determined by the Zerewitinoff method operative in the practice of this invention are those organic compounds having two or more reactive hydrogen atoms which react with organic poly-functional isocyanates to give urethane polymers. The amount of isocyanate employed generally ranges from 1 to 7 equivalents preferably 2 to 6 equivalents, per equivalent of polyether.

The reaction of excess diisocyanate with a polyoxypropylene glycol produces a polymer having terminal isocyanate groups. When it is desired to form a foam, the mixture of the isocyanate-modified polyether reacts through the isocyanate groups with a chain-extending agent containing active hydrogen such as water. This involves several reactions that proceed simultaneously including the reaction between the isocyanate groups and water to form urylene links (—NHCONH—) and carbon dioxide, as well as the reaction of the urylene links so formed with unreacted isocyanate groups to form biuret cross links. Depending upon the desired density of the urethane foam and the amount of cross linking desired, the total isocyanate equivalent to the active hydrogen equivalent should be such as to provide a ratio of 0.8 to 1.2 equivalents of isocyanate per equivalent of active hydrogen, and preferably a ratio of about 0.9 to 1.1 equivalents.

Cell modifying agents, e.g. silicones such as trimethyl end-blocked dimethyl polysiloxanes may also be used in the practice of this invention.

Other well known additaments can be added to the polyurethane recipe such as clay, talc, TiO$_2$, silica and hydrated silica, CaCO$_3$, metal chromates, barytes, phthalocyanine green or blue pigments, red iron oxide, conventional stabilizers, carbon black, dyes, toners, epoxidized soy bean oil (Paraplex G-62), epoxides (Epon 828), tricresyl phosphate, antioxidants, fungicides, bacteriostats and the like. These constituents can be added in various amounts to the ingredients to achieve the desired properties in the resultant elastomers or foams.

The preparation of the polyurethane elastomers and foams of the present invention can be formed by a process known in the art as the "one-shot" process by a two step process involving, first, the preparation of a "prepolymer," the well known "semi-prepolymer" or "quasi-prepolymer" technique. There all or a portion of the polyol is reacted with all of the organic polyisocyanate, providing a reaction product which contains a high percentage free isocyanate groups and which is reacted with the remaining portion of the hydroxyl-terminated polyol or a cross-linker, together with water, catalysts, and metal oxides to form a rubbery, cellular, elastic product.

In the practice of this invention, the gel catalyst and the blowing catalyst may be present in ratio of 0.01 to 5 parts, say 1 part of the former per part of the latter. In one preferred embodiment, when the blowing catalyst is used with stannous 2-ethylhexoate as the gel catalyst, the ratio will be approximately 1.

Preferably the catalyst mixture will be present in catalytic amount corresponding to 0.01 to 5, say 0.6 parts by weight per 100 parts of polyol. Preferably, the blowing catalyst will be present in a catalytic amount corresponding to 0.005 to 4.95, say 0.3 parts by weight per 100 parts of polyol, and the gel catalyst will be present in catalytic amount corresponding to 0.005 to 4.2 parts, say 0.3 parts by weight per 100 parts of polyol.

EXAMPLE 1

Practice of this invention according to its specific embodiments may be observed by forming a typical one-shot polyether flexible foam by mixing (a) 200 grams of polymeric polyether polyol (the polyether triol formed as the condensation product between glycerine and propylene oxide, having a molecular weight of about 3,000, a hydroxyl number of about 32–33, and sold under the trademark Niax Polyol 32–33; (b) 3.0 grams of cell modifying agent, silicone (Union Carbide Chemical Co. L-540 brand of trimethyl end-blocked dimethyl polysiloxane); (c) 42 grams of a mixture of 60% of tolylene diisocyanate (80%:20% ratio of 2,4- and 2,6-isomers) and 40% polymethylene polyphenylisocyanate; (d) 0.8 grams of Bis(dimethylamino ethyl) ether; (e) 5.0 grams of Bis(o-aminophenylthio) methane cross-linking agent; (f) 0.2 grams of cyclic triethylene diamine; and (g) 2.6 grams of demineralized water.

In each of the examples, all of the components of the formulation were vigorously stirred upon mixing. The reaction started substantially immediately as evidenced by foaming. The cellular polyurethane product foamed and gelled promptly. The rise time was noted as the time at which the foam had risen to its maximum height. The exotherm was measured by placing a thermometer in the foam and noting the highest temperature to which it rose. Immediately after the mass had foamed, the surface was scraped with a spatula; this was done at 5-second intervals. The gel time was that time when, after scraping, the material did not flow or knit back together. The gel and rise times obtained by these tests are readily correlatable with those obtained in commercial practice. The results were that a superior cold cure foam was obtained.

EXAMPLE 2

The process of the foregoing example was used except that the composition was comprised of the following mixture of components:
a. 100 parts of polyalkylene polyol (the polyether triol formed as the condensation product of glycerine and propylene oxide, having a molecular weight of about 3,000, a hydroxyl number of about 56, and sold either under the trademark NIAX TRIOL LG-56 by Union Carbide Chemicals Company or GP 3030 by Wyandotte Chemical Company);
b. 1.5 part of silicone cell modifying agent (Union Carbide Chemical Co. L-540 brand of trimethyl endblocked dimethyl polysiloxane);
c. 45.0 parts of tolylene diisocyanate (80%:20% ratio of 2,4- and 2,6-isomers);
d. 3.5 parts of demineralized water;
e. 0.3 parts N-ethyl morpholine as a foaming or blowing catalyst in the amount indicated;
f. 0.3 parts of stannous octoate el catalyst; and
g. 0.2 parts bis(o-aminophenylthio) methane as a cross-linking agent.

All parts indicated in the examples are by weight.

In each of the examples, all of the components of the formulation may be vigorously stirred upon mixing. The reaction started substantially immediately as evidenced by foaming. After foaming, the compression load deflection (C.L.D.) was measured.

EXAMPLE 3

A resilient polyurethane foam was prepared according to the following composition:

| Component | Parts |
| --- | --- |
| Polyether* | 100.0 |
| Silicone** | 1.5 |
| Water | 3.5 |
| Foaming catalyst | As indicated |
| Stannous octoate | 0.3 |
| N-ethyl morpholine | 0.3 |
| Tolylene diisocyanate | 45.0 |
| 80%:20% ratio of 2,4- and 2,6-isomers) | |
| Organotin gel catalyst | 0.6 |

*polyether triol of glycerine and propylene oxide, having a molecular weight of about 3000, a hydroxyl number of about 56, and sold under the trademark NIAX TRIOL LG-56.
**trimethylol end-blocked dimethyl polysiloxane sold under the trademark Union Carbide L-540.

In each case, the polyether, polyisocyanate and other components were mixed simultaneously. The mixtures were allowed to react without external heating. Rise time, i.e. the time required for the foam to reach its maximum height, was observed and recorded. Gel time, i.e. the time required for the mixture to become non-flowable, was also noted.

The first catalyst employed for purposes of comparison was triethylene diamine foam catalyst (sold as Dabco 33-LV by Houdry).

Stannous 2-ethylhexoate and stannous oleate are typical of the gelling catalysts which may commonly be made by neutralizing an aqueous solution of stannous salt with a soap of the desired acid, RCOOH; typically an aqueous solution of stannous chloride may be reacted with a solution of sodium octoate to give the compound stannous octoate, a typical example of materials commonly believed to have the formula $SN(OCOR)_2$.

Similarly, selected reactions were run using other polyols, e.g. specifically a polyester of adipic adid having a hydroxyl number of 52 sold under the trademark FOAMREZ-50 by Witco Chemical Company.

Comparative polyurethane foams were prepared using only the N-ethyl morpholine as a blowing or foaming catalyst. The product foams of this invention may be characterized by outstanding physical properties and hand, a fact which is at least a part due to the excellent balance which may be obtained in the completing gelling and foaming reactions. In addition, because of the surprisingly high efficiency of the diorganotin mixed ester catalysts, the foams may contain lower amounts of catalyst residues. Dry heat stability and aging properties may be superior to prior art foams. Accordingly, the foams of this invention may possess a uniquely wide area of utility. The foam prepared in accordance with this invention had outstanding physical characteristics, including freedom from splitting and closed cells. Similar results may be obtained when organotin mixed ester catalysts of this invention are employed.

The novel compositions of this invention which are suitable for use as cross-linking catalysts in the production of polyurethane foams by the reaction of a substance having active hydrogen atoms as determined by the Zerewitinoff method, e.g. a polyalkylene polyol, water and an organic poly-functional isocyanate, may contain a gel catalyst, a blowing catalyst, in combination with at least one compound selected from those of the formula:

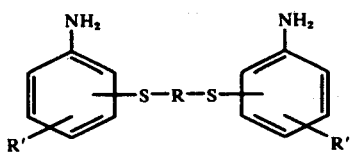

wherein R is a hydrocarbon, and R' is selected from the group consisting of hydrogen, halogens, and hydrocarbons.

These novel compositions are odor-free, complete catalysts for polyurethane production. The novel polyurethane foams obtained by the process of this invention find a wider variety of uses than polyurethanes heretofore known.

The novel cellular polyurethane compositions prepared in accordance with this invention comprise a cellular polyurethane containing a gelling agent and as a synergistic blowing agent combination 0.004–4.5 parts by weight per 100 parts by polyurethane composition of at least one compound selected from those of the formula:

wherein R is a hydrocarbon, and R' is selected from the group consisting of hydrogen, halogens, and hydrocarbons.

This novel cellular polyurethane composition may be readily formed into shaped cellular polyurethane objects which may find use in the fabrication of cushions, insulation, and in other areas where cellular polyurethane compositions have heretofore been employed.

The curing agent may be mixed with a polyisocyanate prepolymer and the mass cured at room temperature or slightly above room temperature to provide a resilient, tough, rubber-like elastomer.

The liquid polyisocyanate prepolymer used as described above with the new curing agent consisted of the reaction product of (1) polytetramethylene ether glycol (PTMEG, manufactured by Quaker Oats Company), and (2) an 80:20 mixture of 2,4- and 2,6-tolylene diisocyanate, the productions one to two moles by weight.

The polymeric polyols which may be used to prepare the isocyanate-terminated prepolymer include the polyalkylene ether glycols; the polyalkylene-arylene ether glycols; the hydroxy terminated polyesters, such as polyethylene adipate, polyethylene sebacate, and the like. The polyol may be represented by the formula: $HO(RO)_nH$ where R is either an alkylene radical containing up to 10 carbon atoms, or alkylene-arylene ester group containing molecule and $n$ is an integer sufficiently large so that the molecular weight of the polymeric polyol is about 400 to 6,000.

Any of a wide variety of organic diisocyanate may be employed to prepare the polyisocyanate prepolymer. Suitable compounds include: 2,4-tolylene diisocyanate; 1,5-naphthalene diisocyanate; m-phenylene diisocyanate; 3,3'-dimethyl-4,4-biphenylene diisocyanate, 4,4'-methylene bis(phenyl isocyanate), and the like.

Comparative physical properties of the urethane elastomers cured with these hardeners and MOCA (4,4'-methylene bis(2-chloroaniline) are listed in Table I.

TABLE I

| Curing Agent | Amount PBW 100 PBW | Working Life | Hardness Shore A | Tensile Strength psi | Elongation % | Tear Strength |
|---|---|---|---|---|---|---|
| Bis(o-aminophenylthio)-1,2 propane | 21.5 | 20 mins. at 25° C. | 75 | 7630 | 570 | 380 |
| Bis(o-aminophenylthio) 1,2 propane | 38.6 | 60 min. at 25° C. | 75 (D) | 4350 | 230 | 930 |
| Bis(o-aminophenylthio)-1,2 propane | 22 | 25 min. at 25° C. | 83 | 4435 | 340 | 490 |
| Bis(o-aminophenylthio)-1,2 propane | 21.6 | 20 min. at 25° C. | — | 3640 | 570 | 190 |
| Bis(o-aminophenylthio)-1,2 propane | 11.6 | 20 min. at 25° C. | — | 4270 | 570 | 180 |
| Bis(o-aminophenylthio) ethane | 20.5 | 25 min. at 25° C. | 75 | Comparable with Example 2 | | |
| Bis(o-aminophenylthio) methane | 19.4 | 30 min. at 25° C. | 85 | Comparable with Example 2 | | |

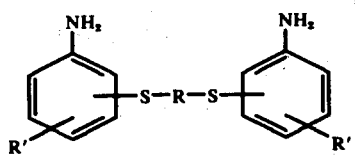

EXAMPLE 14

A 500 ml., 3 neck reaction flask, equipped with a mechanical stirrer and reflux condenser was charged with 125 grams (1 mole) of 2-aminobenzenethiol (2-ABT). With good agitation and cooling, a solution of 40 grams (1 mole) of sodium hydroxide in 60 grams of water was slowly added over a period ranging from 5 to 20 minutes. The addition was controlled so that the reaction temperature did not rise over 95°–100° C. To the above sodium-2-aminobenzenethiol (Na-2-ABT)

solution, 50 grams (0.506 mole) of ethylene dichloride was added over a period of 3 hours at pot temperature of 90°–95° C. After the addition, the mixture was reacted at 100°–105° C. for an additional 4 hours. Water (200 ml.) was then added and stirred for a few minutes and phase separated. The aqueous salt solution was discarded and the organic layer was washed 2 times with 100 ml. portion of water and distilled under reduced pressure of 25 mm. to pot temperature of 130° C. The distillation residue was filtered while hot to remove the residual salt. The filtrate, weighing 274.7 grams (99% of the theoretical yield), a yellowish white solid, recrystallized 3 times from methanol, a white solid had a melting point of 75.5°–76.5° C.

| Analysis | C% | H% | N% | S (by difference) |
|---|---|---|---|---|
| | | Calcd. for $C_{14}H_{16}N_2S_2$ | | |
| Calcd. | 60.86 | 5.79 | 10.10 | 23.21 |
| Found | 60.62 | 5.82 | 9.99 | 23.57 |

EXAMPLE 15

Following the procedure described in Example 14, substituting 1,4-dichlorobutane (64.5 grams, 0.507 mole) for ethylene dichloride, a product of a light brown low viscosity liquid was obtained with a theoretical yield of better than 95%. This hardener, when cured with an equivalent weight of polyisocyanate prepolymer having an amine equivalent weight of 650, gave a Shore A hardness of 73, and had a working life of better than 20 minutes.

EXAMPLE 16

Following the procedure described in Example 14, substituting 1,4-dichlorobutene-2 for ethylene dichloride, yielded a product with m.p. 64°–68° C. (theoretical yield of 98.5%).

| Analysis | C% | H% | N% | S (by difference) |
|---|---|---|---|---|
| | | Calculated for $C_{16}H_{18}N_2S_2$ | | |
| Calculated | 63.57 | 5.98 | 9.24 | 21.21 |
| Found | 65.41 | 6.06 | 8.76 | 19.77 |

Twenty-three parts of this hardener mixed thoroughly with 100 parts of polyisocyanate prepolymer (amine eq. wt. 650), gave a polyurethane elastomer of excellent physical properties.

EXAMPLE 17

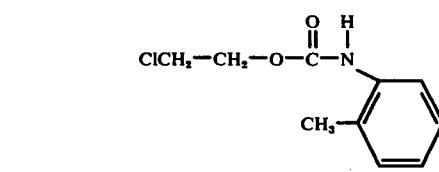

Following the procedure described in Example 14, substituting bis(2-chloroethyl)ether for ethylene dichloride, gave an 80.5% theoretical yield of low viscosity brown liquid. Twenty-three parts of this hardner were mixed thoroughly with 100 parts of polyisocyanate prepolymer (amine eq. wt. 650), yielding a polyurethane elastomer of excellent physical properties.

EXAMPLE 18

Following the procedure described in Example 14, 1,2,3-trichloropropane (75 grams, 0.508 mole) was added into a solution of Na-2-ABT (1.5 moles) over a period of 1.5 hours at a pot temperature of 80°–85° C. The mixture was further reacted at 100°–110° C. for 16 hours. 187 grams (90.5% yield) of low viscosity brown liquid was obtained after the purification. This hardener when cured with polyisocyanate prepolymer (eq. wt. 650), had a Shore A hardness of 5–60 and had a working life of approximately 30 minutes at ambient room temperature.

EXAMPLE 19

Following th procedure described in Example 14, substituting 140 grams (0.502 mole) of chloromethylated diphenyloxide (Dow Chemical's CMDPO-25) for ethylene dichloride, yielded 215.5 grams (97% yield) of soft yellow solid composition. This also gave a hard urethane elastomer of excellent physical properties.

EXAMPLE 20

An adduct of the following structure was prepared:

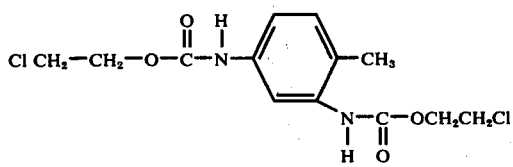

by addition of distilled ethylene chlorohydrin (67 grams, 0.83 mole) to distilled 2,4-tolylene diisocyanate (69 grams, 0.39 mole) and the mixture was reacted at 85°–90° C. for 1.5 hours. The crude product (100% yield) was recrystallized once from benzene to give a crystal with m.p. of 93°–95° C.

The adduct prepared as above (50.3 grams, 0.15 mole) was reacted with 0.316 mole of Na-2-ABT solution at a temperature of 110°–114° C. for 3 hours to give 74.5 grams (97% yield) of viscous hardener. The amine equivalent weight was 268 (theo. 256). Twenty-seven parts of this compound were thoroughly mixed with 65 parts of polyisocyanate prepolymer (eq. wt. 650), and had Shore A hardness of 85 and working life of better than 50 minutes.

EXAMPLE 21

An adduct of the following structure was prepared:

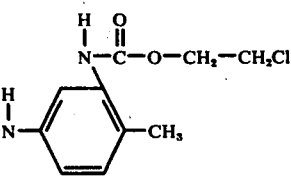

by reacting polyisocyanate prepolymer (130 grams, 0.2 mole) and 19 grams (0.223 eq.) of ethylene chlorohydrin at 85°–90° C. for 4 hours. A solution of Na-2-ABT (0.106 mole) was mixed with a solution of above adduct (73 grams, 0.05 mole) in 50 ml. of toluene and refluxed for 3 hours at 94°–98° C. The product thus obtained was a light brown, viscous, resinous composition weighing 75.5 grams (92.5% yield), and had an amine equivalent weight of 1015. This hardener when cured with an equivalent weight of polyisocyanate prepolymer (amine eq. wt. 650), gave Shore A hardness of 55, and had a working life of better than 1 hour.

EXAMPLE 22

Following the procedure described in Example 14, substituting 1,2-bis(2-chloroethoxy)ethane (200 grams, 1.07 moles) for ethylene dichloride, yielded 363 grams (99% theo.) of dark brown liquid, Brookfield viscosity of 750 cps. at 25° C. Twenty parts of this hardener were mixed thoroughly with 100 parts of polyisocyanate prepolymer (amine equivalent of 650) and a mixture was obtained that had a pourable consistency, a working life of 25 minutes at 75° F., compared with an equivalent cure prepared from dry powdered MOCA (4,4'-methylene bis(2-chloroaniline), which had a working life of 10 minutes at 65° C. Both products showed comparable tensile strength but with the curing agent of above Example 22 had an elongation of 560% compared to the MOCA cure of 350%.

Although this invention has been illustrated by reference to specific embodiments, modifications thereof which are clearly within the scope of the invention will be apparent to those skilled in the art.

We claim:

1. The process of making a highly resilient cellular polyurethane which comprises reacting a polyalkylene polyol having reactive hydrogen atoms as determined by the Zerewitinoff method, an organic poly-functional isocyanate, water, and a gel catalyst, said reduction being carried out in the presence of a blowing catalyst and a cross-linking agent comprising at least one compound selected from those of the formula:

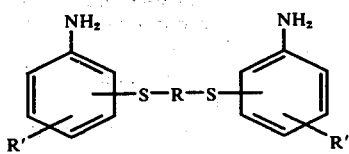

wherein R is selected from the group consisting of a hydrocarbon and a hydrocarbon bearing a non-reactive substituent, and R' is selected from the group consisting of hydrogen, a hydrocarbon and a hydrocarbon bearing a non-reactive substituent.

2. The process of making a cellular polyurethane as claimed in claim 1 wherein said R' is hydrogen.
3. The process of making a cellular polyurethane as claimed in claim 2 wherein said R is alkyl.
4. The process of making a cellular polyurethane as claimed in claim 1 wherein at least one cross-linking agent is bis(o-aminophenylthio)methane.
5. The process of making a cellular polyurethane as claimed in claim 1 wherein at least one cross-linking agent is bis(o-aminophenylthio)ethane.
6. The process of making a cellular polyurethane as claimed in claim 1 wherein at least one cross-linking agent is bis(o-aminophenylthio)-1,2 propane.
7. The process of making a highly resilient cellular polyurethane as claimed in claim 1 wherein said blowing catalyst is at least one tertiary amine:
8. The process of making a cellular polyurethane as claimed in claim 7 wherein said tertiary amine is N-ethyl morpholine.
9. The process of making a highly resilient cellular polyurethane as claimed in claim 1 wherein the gel catalyst is a compound selected from the group consisting of $Sn(OCOR)_2$ and $R'_aSnX_b$ wherein R and R' are hydrocarbon radicals and X is selected from the group consisting of chloride and negative residual portions of organic carboxylic acids, mercaptides, alcohols, and esters of mercaptoacids, $a$ and $b$ being 1–3, $a$ plus $b$ being 4.

10. The process of claim 1 wherein said cross-linking agent is present in an amount of 0.0001–5 parts by weight of the polyol.

11. The process of making a highly resilient cellular polyurethane which comprises reacting 100 parts by weight of a substance having active hydrogen atoms as determined by the Zerewitinoff method, 5–300 parts by weight of an organic poly-functional isocyanate, 0.5–10 parts by weight of water, 0.005–4.2 parts by weight of gel catalyst, as a blowing catalyst 0.005 to 4.95 parts by weight of at least one tertiary amine and as a cross-linking agent 0.005 to 10 parts by weight per 100 parts by weight of polyol of at least one compound exhibiting the formula:

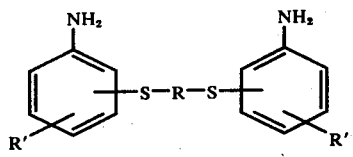

wherein R is selected from the group consisting of a hydrocarbon and a hydrocarbon bearing a non-reactive substituent, and R' is selected from the group consisting of hydrogen, a hydrocarbon and a hydrocarbon bearing a non-reactive substituent.

12. The process of making a highly resilient cellular polyurethane which comprises reacting 100 parts by weight of a substance having active hydrogen atoms as determined by the Zerewitinoff method, 5–300 parts by weight of an organic poly-functional isocyanate, 0.5–10 parts by weight of water, 0.005–4.2 parts by weight of gell catalyst, 0.005 to 4.95 parts by weight of a blowing catalyst and as a cross-linking agent 0.005 to 10 parts by weight of a compound of the formula:

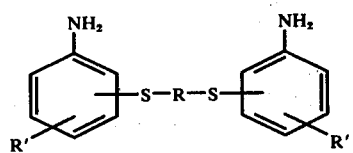

wherein R is alkyl and R' is hydrogen.

13. A novel composition suitable for use as a cross-linking agent in the production of highly resilient cold cure polyurethane foams formed by the reaction of an organic compound having reactive hydrogen atoms as determined by the Zerewitinoff method, water, and an organic polyisocyanate comprising at least one compound of the formula:

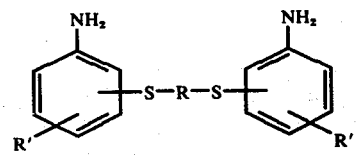

wherein R is selected from the group consisting of a hydrocarbon and a hydrocarbon bearing a non-reactive substituent, and r' is R' from the group consisting of hydrogen, a hydrocarbon and a hydrocarbon bearing a non-reactive substituent, and as a blowing catalyst at least one tertiary amine selected from the group consisting of N-alkyl morpholines and cyclic triethylene diamines and mixtures thereof.

14. The composition of claim 13 wherein at least one tertiary amine is N-ethyl morpholine.

15. The composition of claim 13 wherein at least one tertiary amine is cyclic triethylene diamine.

16. The composition of claim 13 wherein R' is hydrogen.

17. The composition of claim 16 wherein R is alkyl.

18. A novel composition for use as a catalyst in the production of cellular polyurethane which comprises 0.005 to 10 parts of at least one compound of the formula:

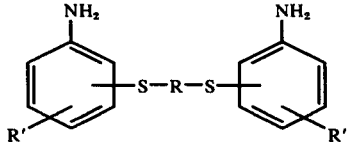

wherein R and R' are hydrocarbons selected from the group consisting of alkyl, alkenyl, cycloalkyl, aryl, alkaryl, and aralkyl hydrocarbon and as an auxiliary catalyst 0.005 to 10 parts of a compound selected from the group consisting of $Sn(OCOR)_2$ and $R'_aSnX_b$ wherein R and R' are hydrocarbon radicals and X is selected from the group consisting of chloride and negative residual portions of organic carboxylic acids, mercaptides, alcohols, and esters of mercaptoacids, and $a$ and $b$ being 1–3, $a$ plus $b$ being 4.

19. A novel catalyst composition suitable for use in the production of polyurethane foams as claimed in claim 18 wherein the catalyst and auxiliary catalyst are present in the ratio of 0.01 to 5 parts of the former per part of the latter.

20. A novel cellular polyurethane composition which comprises a cellular polyurethane containing as a blowing catalyst and curing agent a mixture of at least one tertiary amine selected from the group consisting of N-alkyl morpholines and cyclic triethylene diamines and mixtures thereof and a nitrogen-containing organic compound of the formula:

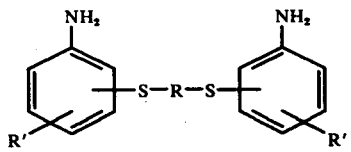

wherein R is selected from the group consisting of a hydrocarbon and a hydrocarbon bearing a non-reactive substituent, and R' is selected from the group consisting of hydrogen, a hydrocarbon and a hydrocarbon bearing a non-reactive substituent.

21. A novel cellular polyurethane composition as claimed in claim 20 wherein the nitrogen-containing organic compound is bis(o-aminophenylthio)methane.

22. A novel cellular polyurethane composition as claimed in claim 20 wherein the nitrogen-containing organic compound is bis(o-aminophenylthio)ethane.

23. A novel cellular polyurethane composition as claimed in claim 20 wherein the nitrogen-containing organic compound is bis(o-aminophenylthio)-1,2 propane.

24. A process of making an elastomeric polyurethane plastic which comprises mixing an organic polyisocyanate with a mixture of an organic compound having reactive hydrogen atoms as determined by the Zerewitinoff method having a molecular weight of at least about 500, and 0.005 to 10 parts by weight per 100 parts by weight of polyol of at least one compound of the formula:

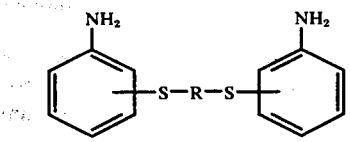

wherein R is selected from the group consisting of a hydrocarbon and a hydrocarbon bearing a non-reactive substituent.

25. The process of making an elastomeric polyurethane plastic which comprises mixing an organic compound having reactive hydrogen atoms as determined by the Zerewitinoff method having a molecular weight of at least about 500, an organic polyisocyanate thereby forming a prepolymer, and curing said prepolymer by mixing therein 0.005 to 10 parts by weight per 100 parts by weight of polyol of at least one curing agent of the formula:

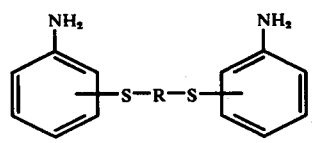

wherein R is selected from the group consisting of a hydrocarbon and a hydrocarbon bearing a non-reactive substituent.

26. In the preparation of an elastomeric polyurethane plastic by a process which comprises reacting an organic compound having reactive hydrogen atoms as determined by the Zerewitinoff method and an organic polyisocyanate, the improvement which comprises reacting as a curing agent 0.005 to 10 parts by weight per 100 parts by weight of polyol of at least one compound selected from those of the formula:

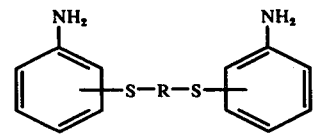

wherein R is selected from the group consisting of a hydrocarbon and a hydrocarbon bearing a non-reactive substituent.

27. A novel composition suitable for use as a curing and cross-linking agent in the production of polyurethane foams by the reaction of an organic compound having reactive hydrogen atoms as determined by the Zerewitinoff method, water and a poly-functional isocyanate comprising a compound of the formula:

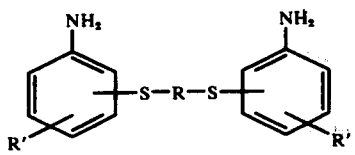

wherein R is selected from the group consisting of a hydrocarbon and a hydrocarbon bearing a non-reactive substituent, and R' is selected from the group consisting of hydrogen, a hydrocarbon and a hydrocarbon bearing a non-reactive substituent, and stannous 2-ethyl hexanoate.

28. The process of making an elastomeric polyurethane plastic which comprises reacting an organic compound having reactive hydrogen atoms as determined by the Zerewitinoff method with an organic polyisocyanate in the presence of 0.005 to 10 parts by weight per 100 parts by weight of polyol of at least one compound selected from those of the formula:

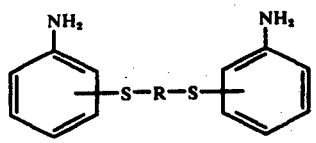

wherein R is selected from the group consisting of a hydrocarbon and a hydrocarbon bearing a non-reactive substituent.

* * * * *